United States Patent
Senge

(10) Patent No.: US 8,911,654 B2
(45) Date of Patent: Dec. 16, 2014

(54) PROCESS AND APPARATUS FOR MOULDING A GLAZING PROFILE ONTO A GLAZING

(75) Inventor: Christoph Senge, Dillingen (DE)

(73) Assignee: Pilkington Group Limited, Lancashire (GB)

( * ) Notice: Subject to any disclaimer, the term of this patent is extended or adjusted under 35 U.S.C. 154(b) by 0 days.

(21) Appl. No.: 13/994,592

(22) PCT Filed: Dec. 15, 2011

(86) PCT No.: PCT/GB2011/052489
§ 371 (c)(1),
(2), (4) Date: Jun. 14, 2013

(87) PCT Pub. No.: WO2012/080739
PCT Pub. Date: Jun. 21, 2012

(65) Prior Publication Data
US 2013/0270738 A1     Oct. 17, 2013

(30) Foreign Application Priority Data

Dec. 15, 2010  (GB) ................................. 1021271.0

(51) Int. Cl.
*B29C 45/14*     (2006.01)
*B29C 70/76*     (2006.01)
(52) U.S. Cl.
USPC ..... 264/275; 264/297.2; 425/127; 425/129.1; 425/588; 425/589
(58) Field of Classification Search
None
See application file for complete search history.

(56) References Cited

U.S. PATENT DOCUMENTS

| 4,012,053 | A   | 3/1977 | Bode |
| 4,761,916 | A   | 8/1988 | Sanok et al. |
| 6,123,535 | A * | 9/2000 | Ash et al. ...................... 425/125 |

(Continued)

FOREIGN PATENT DOCUMENTS

| DE | 30 37 251 A1 | 4/1982 |
| DE | 20 2007 016 976 U1 | 2/2008 |

(Continued)

OTHER PUBLICATIONS

International Search Report (PCT/ISA/210) issued on May 3, 2012, by the British Patent Office as the International Searching Authority for International Application No. PCT/GB2011/052489.

(Continued)

*Primary Examiner* — Edmund H. Lee
(74) *Attorney, Agent, or Firm* — Buchanan Ingersoll & Rooney PC

(57) ABSTRACT

A process for manufacturing at least two different discrete edge encapsulated glazings comprising panes of glass of different configuration, the process comprising molding a glazing profile onto at least part of the periphery of each pane of glass in a composite mold. This composite mold comprises multiple different interchangeable mold modules, each mold module comprising at least one mold cavity, and the composite mold therefore has two or more mold cavities configured differently to receive different panes of glass. Fluid elastomeric material is injected into the mold cavities at the same time, so that a glazing profile is molded onto each of the panes of glass concurrently. An injection molding apparatus comprising the composite mold may have multiple injection systems for the different mold cavities, allowing different molding materials to be used. The apparatus also includes a clamp unit having platens to which the multiple mold modules are attached.

15 Claims, 4 Drawing Sheets

(56) References Cited

U.S. PATENT DOCUMENTS

| | | | |
|---|---|---|---|
| 6,495,082 B1 * | 12/2002 | Ash et al. | 264/240 |
| 2003/0017309 A1 | 1/2003 | Caldoro et al. | |
| 2004/0091569 A1 | 5/2004 | Babin | |
| 2005/0269741 A1 | 12/2005 | Rigby et al. | |

FOREIGN PATENT DOCUMENTS

| | | |
|---|---|---|
| JP | 1-067318 A | 3/1989 |
| JP | 8-118404 A | 5/1996 |
| JP | 10-166399 A | 6/1998 |
| JP | 2009-154385 A | 7/2009 |
| NL | 1011392 C2 | 11/2000 |
| WO | WO 00/38899 | 7/2000 |

OTHER PUBLICATIONS

Search Report issued on Mar. 31, 2011 by the UK Intellectual Property Office in counterpart UK Application No. GB1021271.0 for Claims 1-6 (3 pgs).

Search Report issued on Mar. 31, 2011 by the UK Intellectual Property Office in counterpart UK Application No. GB1021271.0 for Claims 7-15 (1 pg).

"Injection Molding", from Wikipedia, printed on Apr. 1, 2014 (11 pgs), including summary of "Selecting Injection Molds: Weighing Costs vs Productivity"; book mentioned at footnote 17 of Wikipedia entry.

* cited by examiner

PROCESS AND APPARATUS FOR MOULDING A GLAZING PROFILE ONTO A GLAZING

The present invention relates to a process for moulding a glazing profile onto a glazing, to an apparatus on which the process may be performed, and also to a mould which forms part of the apparatus.

Glazings comprising a pane of glass with a glazing profile moulded around at least part of the periphery of the pane are known. The glazing profile is composed of elastomeric material, which may be one of several thermoplastic or thermosetting materials. Glazing profiles fulfil an important role in the glazing of panes, especially but not exclusively in the automotive industry. In general terms, the glazing profile contributes to the positioning, sealing and general appearance of the glazing. More specifically, with reference to the automotive industry, the glazing profile together with a suitable adhesive provides a watertight and weatherproof seal between the glazing and the vehicle body. The glazing profile may provide a substrate for the adhesive, and will normally assist in controlling its position and spread. Moreover, the glazing profile protects the adhesive from the damaging effect of light, particularly the degradation caused by the ultraviolet component of sunlight, and generally conceals the adhesive from view. Most glazing profiles also carry out a positioning function, being designed to ensure that the final position of the glazing relative to the vehicle body is correct.

A known process for providing a glazing profile on a pane of glass is to mould the glazing profile directly in situ on the glass. This is achieved by placing the glass in a suitably designed injection mould with the edge of the glass situated in the mould cavity, closing the mould and injecting elastomeric material, a process known as edge encapsulation. The moulded articles thereby produced are commonly referred to as "parts". This process is able to yield large numbers of parts at high production rates, with great dimensional accuracy and a high degree of reproducibility. However, injection moulds (also known as "tools" or "tooling") are expensive and time-consuming to produce, requiring a considerable amount of machining To manufacture injection moulded parts economically, it is therefore important to spread the cost of the tooling over a large number of parts, i.e. to manufacture high volumes, preferably with minimal interruption. In this context it should be noted that that it is an inherent characteristic of injection moulding that the tooling must be changed in order to manufacture different parts, i.e. to make moulded articles which are of different shape, size or configuration. In an automotive context, one example of a different part would be a glazing for a different vehicle. When sufficient numbers of one part have been produced, the process is stopped, and the tooling is changed, i.e. a period of non-production or "downtime" is inevitably associated with a tool change.

The economic aspects of injection moulding involve various costs, some of which are independent of the quantity of parts produced (fixed costs), and others which are related, either directly or indirectly, to the quantity produced. For instance, the injection moulding operation is carried out in an injection moulding machine, which is an expensive piece of equipment, and represents a fixed cost. There are further fixed costs associated with providing the factory in which the machine is situated. Furthermore, such a machine requires a number of operators, so there is also a labour cost associated with the operation of the machine. Further costs include energy and other utility costs. All these costs need to be recouped from the parts produced by the machine.

In order to reduce the contribution of these costs to the cost of each part produced, it is desirable to increase the rate of production so that the costs are spread over a greater number of parts. However, increasing the rate of production is only a viable route to reducing costs if high volumes of the part in question are required. For low volume parts, this approach merely results in the volume required being achieved very quickly, and the injection moulding machine being shut down in order to change the tooling, so that a different part can be produced. This causes downtime, and means that the desired effect of a high production rate in reducing production costs is not achieved.

Multi-cavity moulds have been employed in other fields to change the mould in use without the need for a complete shutdown. For instance, WO 00/38899 A1 discloses an injection moulding apparatus for use with a variety of different interchangeable moulding tools that allows the simultaneous moulding of different plastic parts. The moulding tools are inserted into cavities in the moulding apparatus. However, this moulding apparatus is not suitable for moulding onto glass, and so cannot be used to produce edge encapsulated glazings.

Similarly, DE 20 2007 016 976 U1 discloses a moulding tool containing recesses into which individual mould halves placed. This moulding tool is also unsuitable for moulding onto glass.

It is also known to employ a multi-cavity mould to encapsulate discrete window components which are connected to each other to form a one-piece window assembly. US 2005/0269741 A1 discloses a fixed pane window assembly formed in a multi-cavity method. The individual components are disposed in separate mould cavities and sequentially moulded together to provide the desired one-piece window assembly. This document is primarily concerned with producing a one-piece window assembly, i.e. a unified assembly, rather than multiple individual parts.

A need therefore exists for a moulding apparatus suitable for edge encapsulating a variety of different glazings. It would also be desirable to find a more economical way of manufacturing low volume parts, i.e. moulding a glazing profile onto a pane of glass at a relatively low rate, e.g. in terms of parts per hour, yet achieving costs per part which are similar to those parts produced at high rates.

According to a first aspect of the present invention, there is provided a process for manufacturing at least two different discrete edge encapsulated glazings in the same moulding operation, the glazings comprising panes of glass of different configuration, and the process comprising moulding a glazing profile onto at least part of the periphery of each pane of glass by means of the following steps:

provideing a composite mould comprising at least two separate different interchangeable mould modules, each mould module comprising at least one mould cavity, thereby providing at least two different mould cavities, opening the composite mould, loading at least two different panes of glass into the at least two different mould cavities of the open composite mould, closing the composite mould, injecting fluid elastomeric material into the at least two different mould cavities, allowing the elastomeric material to set, opening the composite mould, and removing the at least two edge encapsulated glazings from the composite mould, wherein the liquid elastomeric material is injected into the at least two different mould cavities at the same time, so that a glazing profile is moulded onto each of the two different panes of glass concurrently.

It is advantageous to manufacture different edge encapsulated glazings at the same time because this greatly increases the flexibility of the production line. As previously mentioned, injection moulding machines are expensive, and the invention enables a greater level of utilisation of the machines to be achieved. A factory normally supplies a wide range of parts, and the invention makes it possible to manufacture a greater proportion of the range simultaneously, reducing the need for tool changes and the associated downtime, and reducing the quantity of parts which have to be stored. Furthermore, the invention allows low volume parts to be manufactured alongside higher volume parts, thereby allowing variable production costs such as labour and energy to be spread over a greater number of parts. In effect, it allows a low volume part to be manufactured with the economies of scale of a high volume part, yet without actually producing the high volumes.

A moulding operation is regarded as one sequence of loading the panes of glass into an open mould, closing the mould, injecting fluid elastomeric material, allowing it to set, opening the mould and removing the edge encapsulated glazings. This may also be referred to as one cycle. The term "composite mould" refers to a mould comprising two or more separate different interchangeable mould modules, where each mould module comprises male and female mould sections which together define one or more mould cavities.

The invention even extends to glazings having glazing profiles moulded in different materials. If separate injection units are provided, different fluid elastomeric materials may be injected into two of the at least two different mould cavities.

As will be explained in more detail below, a cycle time may be measured or calculated for each different part produced. Although any combination of parts is possible, greater production efficiency is achieved when parts are matched on the basis of similar cycle times. Thus, a combination of two different parts having different cycle times may be run, but preferably the longer cycle time is within 20% of the shorter cycle time, more preferably, the longer cycle time is within 10% of the shorter cycle time.

Different parts are likely to require different volumes of fluid elastomeric material because one is larger than the other. Alternatively or additionally, some of the parts may have elements of reduced cross-section, with the consequence that there is more resistance to flow of the elastomeric material into the corresponding part of the mould cavity. As a result of these situations, the fluid elastomeric material may be injected into one of the at least two different mould cavities at a different temperature from the temperature at which it is injected into one of the other at least two different mould cavities. Alternatively or additionally, the fluid elastomeric material may be injected into one of the at least two different mould cavities at a different pressure from the pressure at which it is injected into one of the other at least two different mould cavities. Either of these measures may be adopted to provide a different flow rate of elastomeric material into one of the mould cavities, and therefore compensate for different characteristics of the part.

According to a second aspect of the invention, there is provided an apparatus for manufacturing at least two different discrete edge encapsulated glazings in the same moulding operation, the glazings comprising panes of glass of different configuration, by moulding a glazing profile onto at least part of the periphery of each pane of glass, the apparatus comprising:

a composite mould comprising at least two separate different interchangeable mould modules, each mould module comprising male and female mould sections which together define at least one mould cavity for receiving a pane of glass, the at least two mould modules thereby defining at least two mould cavities, at least one mould cavity thereof being different from the others, a clamp unit containing the composite mould, the clamp unit being operable to open the composite mould by separating the mould sections and to close the composite mould by urging the mould sections into sealing contact, the clamp unit being arranged to exert a clamp pressure on the mould sections when the composite mould is closed, and an injection unit comprising means of supplying fluid plastics moulding material into the mould cavities of the composite mould at the same time.

An apparatus as thus defined makes it possible to mould at least two different glazing profiles onto at least two different panes of glass at the same time. As explained above, this enables different parts to be combined to yield greater production efficiency. In effect, it is like integrating two or more injection moulding machines into one, thereby saving on space requirements and capital cost. Further savings may be obtained by avoiding duplication of ancillary equipment, such as priming and loading equipment, and also final finishing and packing stations. It is much more economical to operate a single clamp unit which is large enough to accommodate two or more mould modules, than a corresponding number of individual small lines each having a small clamp unit which only accommodates a small mould corresponding to one mould module.

Generally, the clamp unit comprises fixed and movable platens having faces to which the mould sections are attached. The dimensions of the platens and mould sections are selected so that an integral number of mould sections fit onto each face of each platen. Preferably, the integral number is two, three or four.

It is advantageous to provide a fixing system which is adapted to mount multiple mould sections within the clamp unit, and allows rapid exchange of one or more mould sections.

Although an injection unit shared among the mould modules is a possibility, it is preferable to provide a separate injection unit for each mould module. This enables different moulding materials to be used for different parts being moulded in different mould cavities concurrently.

According to a further aspect of the invention, there is provided a composite mould, comprising two or more separate different interchangeable mould modules, each mould module comprising male and female mould sections which together define one or more mould cavities for receiving a pane of glass, wherein the two or more mould cavities are configured differently so as to receive panes of glass of different configuration. Such a mould is particularly well suited to manufacture parts for which there are differing levels of demand, if two of the two or more mould modules comprise different numbers of mould cavities. The module with the greater number of mould cavities may advantageously be used to mould the higher volume part, and the module with the smaller number of mould cavities may be used to mould the lower volume part.

In this specification, references to different parts, or parts of different configuration, are references to parts intended to glaze different apertures, which may be in the same or different vehicles (in an automotive context), or in the same or different apparatus or buildings (in a non-automotive context). Such parts will be distinctly different in terms of the glass pane or the glazing profile, for instance, one or more dimensions will be different, or the curvature will be different, or the parts will include different inserts or add-ons. For the purpose of this specification, a part and its mirror image are considered to be the same part, e.g. in an automotive context, a left-hand rear quarterlight and a right-hand rear quarterlight are considered to be the same part. Similarly, panes of glass of different configuration have different dimensions or curvatures.

The invention will now be further described by way of the following specific embodiments, which are given by way of illustration and not of limitation, with reference to the accompanying drawings in which.

Figure 1:
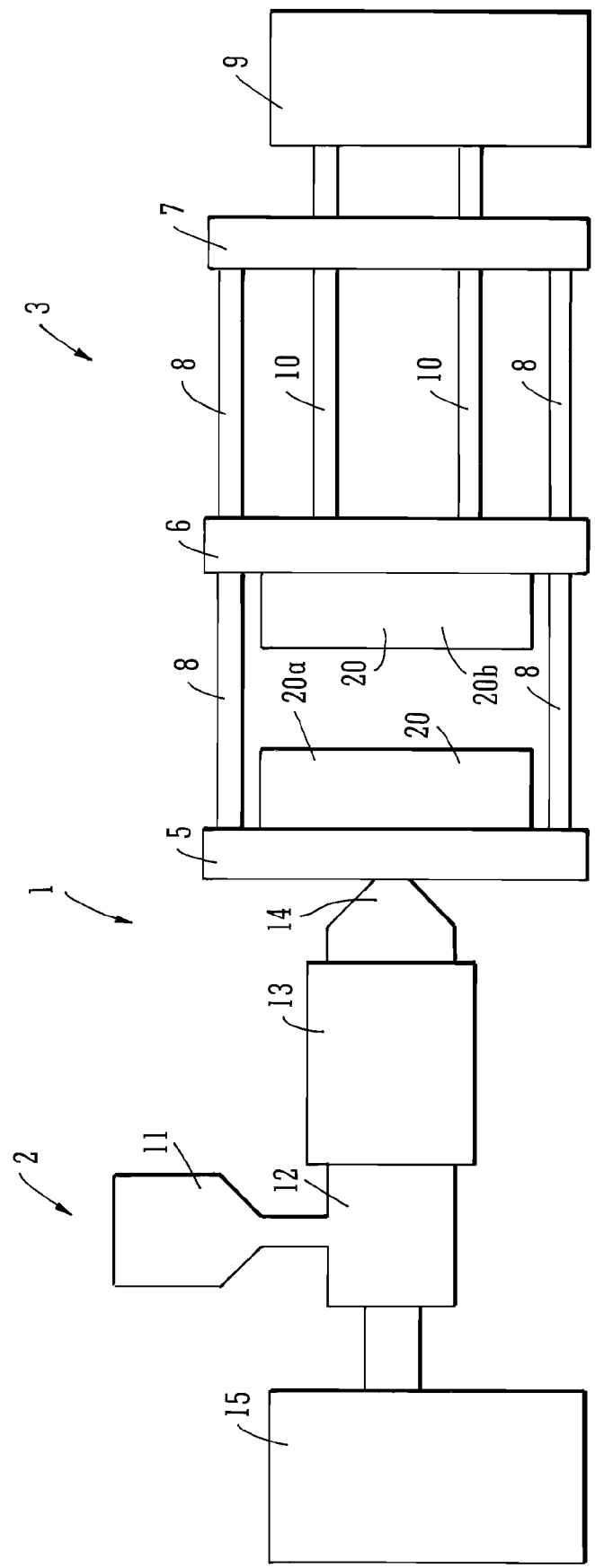
FIG. 1 is a general side view of an apparatus for manufacturing an edge encapsulated glazing according to the invention.

As stated, FIG. 1 shows a general side view of an apparatus for manufacturing an edge encapsulated glazing, the apparatus comprising an injection moulding machine 1. As is generally known, at its broadest the injection moulding process requires fluid plastics material to be injected into a mould, where it solidifies, forming the articles or part required. Solidification may occur as a result of the cooling of molten plastic, or the curing of a mixture of two or more components as a result of a chemical reaction between them; this latter process is known as Reaction Injection Moulding (RIM). The invention will be described in terms of moulding a thermoplastic material, but is equally applicable to either technique, or other moulding techniques. It is therefore equally applicable to thermoplastic and thermosetting materials, and to other materials such as EPDM (ethylene propylene diene monomer) synthetic rubber.

The injection moulding machine 1 comprises two main units, an injection and metering unit 2 and a clamping unit or press 3, which in turn comprise a number of elements. The clamping unit 3 houses a mould 20, comprising two mould modules. Since FIG. 1 is a side view, only one mould module is visible, this module comprising mould sections 20a and 20b. The mould is shown in the open position, i.e. with the mould sections separated or apart. The mould sections are releasably mounted on respective platens 5, 6; platen 5 being a fixed platen and platen 6 a movable platen. There is also a rear platen 7 to which the fixed platen 5 is joined by means of four tie bars 8 (only two of the tie bars being visible in the drawing). The movable platen 6 includes four bores through which the tie bars 8 pass, so that the movable platen 6 can slide along the tie bars. The tie bars 8 extend from the rear platen 7 to the fixed platen 5. A clamp drive unit 9 provides motive power which is transmitted to the movable platen 6 via drive bars 10. Thus by operation of the clamp drive unit 9 the movable platen may be advanced or retracted along the tie bars.

Mould section 20a is mounted on the fixed platen 5, and accordingly remains stationary, whereas mould section 20b is mounted on the movable platen 6, and therefore moves with that platen. The mould is closed by advancing mould section 20b into sealing contact with mould section 20a, mould section 20a being moved by operation of the clamp drive unit 9 as described above. The mould is opened by reversing the clamp drive unit and driving the movable platen away from the fixed platen, so as to separate the mould sections. Mould section 20a is generally the female mould half, i.e. the half containing the mould cavity, or at least the major part of the mould cavity, whereas mould section 20b is generally the male mould half. When the mould is closed, a line is defined where the two mould sections meet, known as the parting line. The position of the parting line in relation to the moulded part has to be chosen carefully to facilitate demoulding.

In accordance with the invention, the mould 20 is a composite mould comprising at least two mould modules and at least two different mould cavities, as will be described in more detail below in conjunction with FIG. 2.

The injection unit 2 prepares, meters and supplies moulding material to the composite mould 20. In view of the need to supply moulding material to two different mould cavities, the injection system is duplicated, although only one injection system is visible in FIG. 1, since, in a side view, the second system is situated directly behind the first.

Each injection system is conventional, and so it will not be described in detail. Each injection system comprises a hopper 11 which holds a supply of raw moulding material, e.g. a plastics material in the form of granules. This material is fed into the barrel 12 of a reciprocating screw feeder (the internal arrangement of the feeder is not illustrated). Each feeder has a heater unit 13 which melts the plastics material while it is advanced towards the mould by rotation of the screw (not shown). A metered quantity of molten plastic (known as the "shot") is injected into the mould via a nozzle 14 by forward movement of the screw, driven by the injection drive unit 15. When the plastic has solidified in the mould, the screw is retracted, and starts filling with plastic for the next shot.

It is within the scope of the invention that three or more mould modules could be provided, in which case a corresponding number of injection systems would also normally be provided. It is also possible that parts of the injection systems be provided in common across the systems, rather than replicating the entire system. For instance, the systems may share a common hopper. However, if separate injection systems are provided, this has the advantage that different moulding materials may be used in different mould modules, e.g. a part may be moulded in PVC in one module, while another part is moulded in thermoplastic elastomer (TPE) in another module. Preferably, each of the injection systems is complete and self-contained.

The fixed platen 5 includes an aperture (see FIG. 4) for the nozzle of each injection system, allowing fluid elastomeric material to flow into the sprue and runners (not shown) in the female mould section 20a. Consequently, the fixed platen is said to be on the injection side of the press. The runners then distribute the fluid elastomeric material to the mould cavities via the gates (also not shown).

The male mould section 20b, which is attached to the movable platen 6, includes an ejection system (not shown) comprising an array of ejector pins. As is conventional, these pins are used to eject the moulded part from the mould when the elastomeric material has set. Hence the movable platen is said to be on the ejection side of the press. Each mould section is provided with its own individually controlled ejection system, so that the movement of the pins can be adjusted to optimise the ejection of the different parts.

Although it is conventional for fluid elastomeric material to be injected into the female mould section, it is possible for the mould sections to be reversed, so that injection is into the male mould section.

Figure 2:
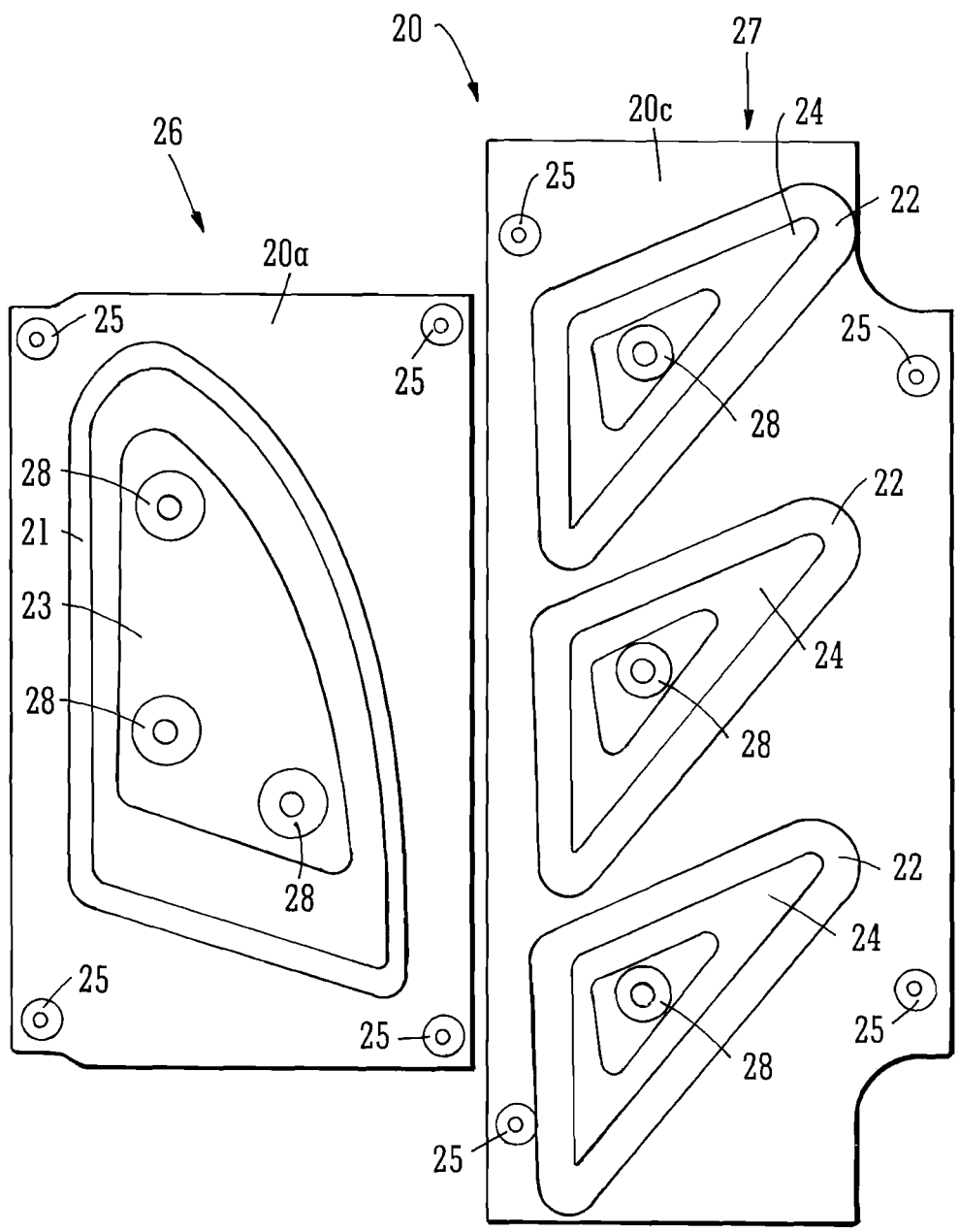
FIG. 2 is a front view of a mould for use in the invention.

FIG. 2 shows part of a composite mould 20, comprising two mould modules. In FIG. 2, mould sections 20a and 20c are visible, which represent the fixed mould sections of the two different mould modules. Mould section 20a comprises a single mould cavity 21, whereas mould section 20c comprises three mould cavities 22. These mould cavities are shown open; they are closed by complementary mould sections, as will be described in more detail below. The mould is provided with seals (not shown) in conventional fashion to prevent leakage of fluid elastomeric material. To avoid breakage of the glass panes when the mould is closed, it is important to avoid direct contact between the glass and the mould metal, i.e. the glass rests on the seals. Recesses 23, 24 are provided in the mould sections to reduce the likelihood of glass-metal contact in the region under the central area of each pane. These recesses also accommodate means for retaining the glass in position, in the form of suction cups 28.

The mould sections 20a and 20c are both mounted on the fixed platen 5 by a mechanical fixing system 25 comprising bosses and corresponding recesses. Sufficient bosses and recesses are provided so that multiple mould sections may be mounted on the platen. This fixing system allows rapid exchange of either or both mould sections. Adjacent mould sections may be attached directly two each other before mounting them on the platen.

The two mould sections 20a and 20c shown each form part of a different mould module. As was seen in FIG. 1, mould section 20a is complemented by mould section 20b to define a mould cavity and form a first mould module 26. The mould cavity 20 is closed by advancing mould section 20b into sealing contact with mould section 20a. In similar fashion, a corresponding male mould section (not shown) complements mould section 20c, and together they define a set of three mould cavities and form a second mould module 27. The two mould modules 26, 27 therefore define different numbers of mould cavities, which, as may clearly be seen, are for different parts. Where a single mould module comprises multiple mould cavities, as in mould section 20c, they will generally be for the same part including mirror images of the part for the left and right sides of a vehicle, but they may also be for different parts, especially parts of similar size and requiring similar volumes of elastomeric material, and which are required in similar volumes, e.g. in conjunction with each other.

Each mould module is adapted for receiving a pane of glass. For instance, each mould cavity is normally provided with elastomeric seals which protrude slightly from the metal of the mould. These seals make sealing contact with the pane of glass, and act both to seal the mould cavity, preventing leakage, and to prevent the pane of glass from making direct contact with the metal mould. Given the clamping pressure and the brittle nature of glass, direct contact of the pane of glass with the metal mould would inevitably result in breakage of the pane of glass.

When using the composite mould 20, four parts are produced in every cycle, i.e. three parts are moulded in mould module 27, and one different part is moulded in mould module 26. The effect of this is that the part moulded in mould module 26 is produced with the same reduced level of costs as if a four cavity conventional mould were used, even though the rate of production of the part is only a quarter of that with the conventional mould. This is an important advantage for low volume parts for which there simply is not the demand to justify the cost of a multi-cavity conventional mould.

As is usual in injection moulding, each mould section is provided with a cooling system, which normally comprises channels bored in the mould section, through which a cooling fluid, normally water, is circulated. Each mould section is provided with its own system of channels, which can be separately connected to the cooling water supply, and controlled so as to optimise the cooling of that section.

Figure 3:
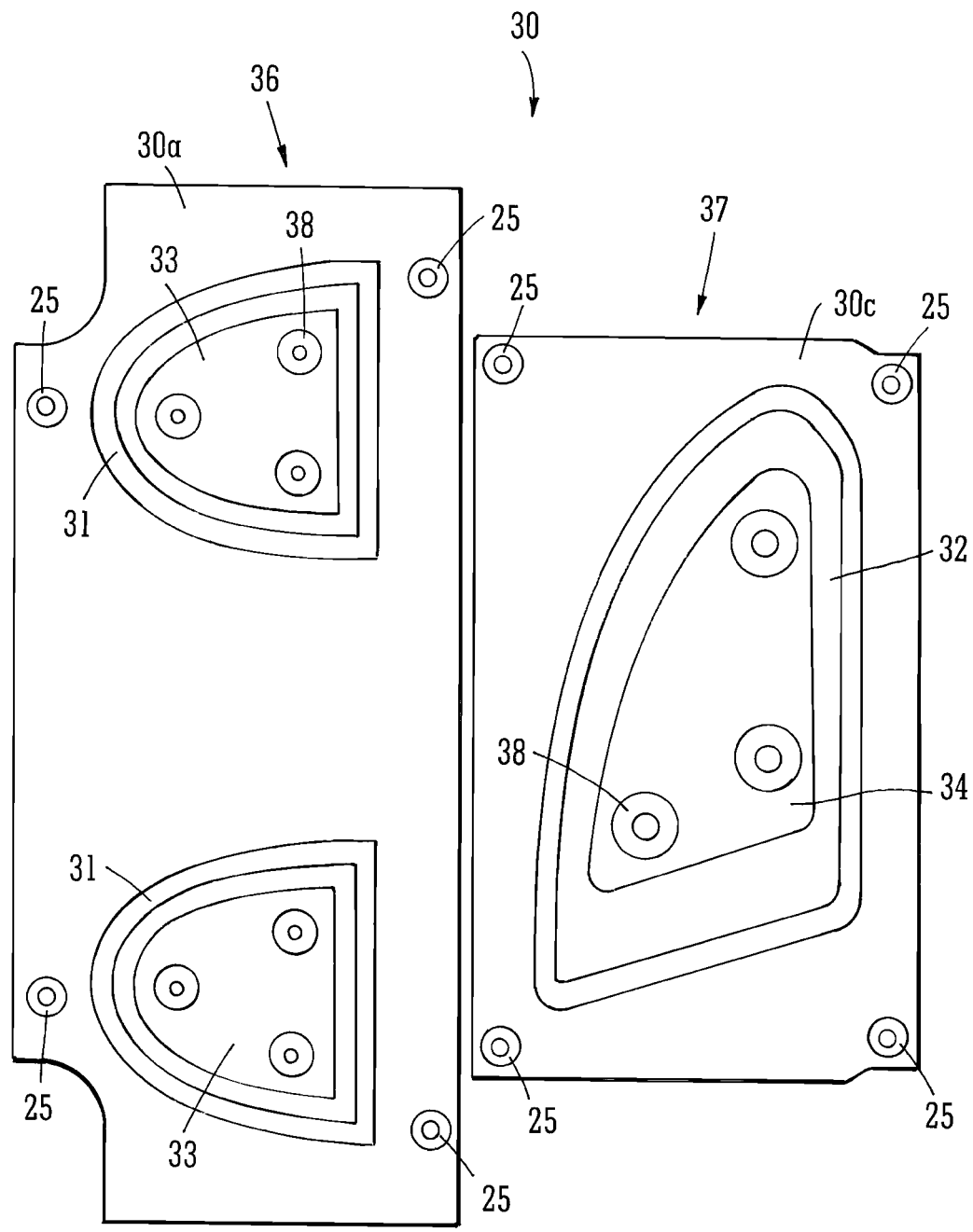
FIG. 3 is a front view of a different mould for use in the invention.

FIG. 3 is a similar view to FIG. 2, but shows a different composite mould 30 comprising mould sections 30a and 30c, which again belong to different mould modules 36, 37. In fact, mould section 30c is the same as mould section 20a of FIG. 2, but it has been inverted. In other words, mould module 37 is the same as mould module 26, but has been paired with a different mould module 36 to make a composite mould 30 which is different from composite mould 20.

Mould section 30a comprises two mould cavities 31, whereas as previously described mould section 30c comprises a single cavity 32. Each mould section is provided with recesses 33, 34 as in the mould sections 20a, 20c of FIG. 2. Similarly, the mould sections are again provided with suction cups 38. The mould 30 utilises the same fixing system 25 as the mould 20 shown in FIG. 2. Moreover, as indicated, the mould modules are interchangeable, and module 26 has been used with modules 27 and 36 to form different composite moulds. In a similar way, mould module 27 could be paired with module 36. Many other pairings of mould modules for other parts are possible, although some combinations are more favourable in terms of production efficiency than others, as will be explained in more detail below.

It may be noted that the composite mould of the present invention is arranged to produce multiple discrete parts, i.e. the finished parts are entirely separate, and are not bonded to each other in any way, nor to they form part of a larger composite part or assembly.

The modular mould sections of the present invention may be provided with sliding cores for moulding undercuts, or may be adapted to receive inserts to be moulded into a part, in the same way as with conventional mould sections.

Figure 4:
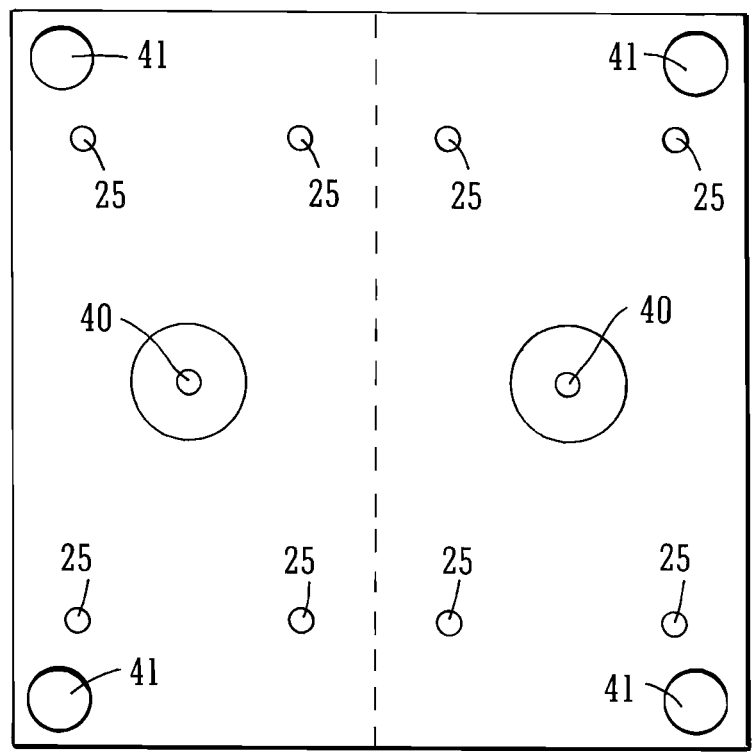
FIG. 4 is a front view of part of the injection moulding machine shown in FIG. 1.

FIG. 4 shows the fixed platen 5 viewed from side on which the mould is mounted, i.e. the opposite side from the injection unit. An injection aperture 40 is defined in the platen through which fluid elastomeric material is injected by the nozzle of the injection unit as described in conjunction with FIG. 1. One injection aperture is provided for each mould module, so in the embodiment shown in FIG. 4 there are two such apertures. The fixed platen 5 is also provided with bores or recesses 41 to accommodate the ends of the tie bars shown in FIG. 1. Furthermore, part of the fixing system 25 comprising bosses and recesses is provided on the platen; it is immaterial whether the bosses and recesses are provided on the platen or the mould. Similarly, an equivalent part of the fixing system 25 is provided on the movable platen 6 in a corresponding manner.

As may be deduced by comparing FIGS. 2, 3 and 4, in this embodiment of the invention, two mould modules may be accommodated on the platens. In the more general case, multiple mould modules are accommodated on the platens, where for practical purposes the number of modules may be two, three or four. Each mould module occupies very approximately one half, one third, or one quarter of the area of a platen. Furthermore, as previously described, each mould module comprises two mould sections, of which one is mounted on the fixed platen and the other is mounted on the movable platen. Preferably, the dimensions of the platens and mould sections are selected so that an integral number of mould sections fit onto each face of each platen.

Figure 5:
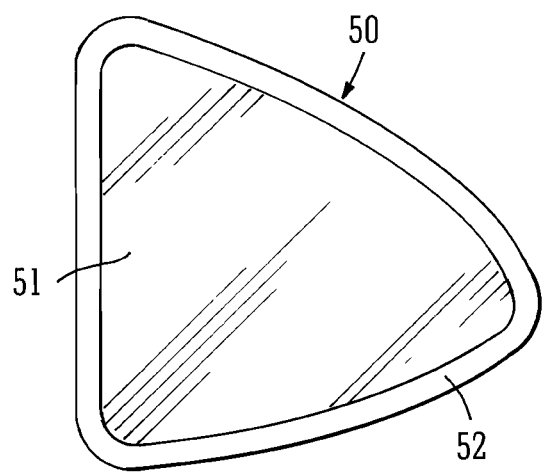
FIG. 5 is a front view of a glazing manufactured according to the invention.

FIG. 5 shows one of the edge encapsulated glazings which may be manufactured by the process of the invention. The glazing 50 comprises a pane of glass 51 onto which a glazing profile 52 has been moulded in situ by the process and on the apparatus described herein. The pane of glass 51 is one of two or more panes which are loaded into the mould cavities of a composite mould so that the panes may be edge encapsulated concurrently. Although in FIG. 5 the glazing profile 52 is shown extending around the entire periphery of the pane of glass 51, in the case of other glazings the profile may only extend around part of the periphery of the pane of glass.

The process of manufacturing edge encapsulated glazings will now be described. First, panes of glass are primed in a conventional manner. The composite mould is opened by operation of the clamp drive unit which withdraws the movable platen and its attached mould sections from the fixed platen and its attached mould sections. The mould cavities may be treated with a mould release agent to facilitate removal of the finished part after moulding. An appropriate number (normally one per mould cavity) and type of panes of glass are loaded into the open mould cavities. A preferred way of doing this is by a robot provided with a glass handling attachment adapted to carry all the panes simultaneously, so that they may all be loaded into the mould cavities at once. The mould is then closed, again by operation of the clamp drive unit. Fluid elastomeric material (of one or more types, according to the parts being produced) is injected concurrently into all the mould cavities by the multiple injection units, as previously described. The material is allowed to set, setting being hastened by cooling the mould. When the material has set, the mould is opened and the edge encapsulated glazings are removed, again preferably by robot.

As previously mentioned, the provision of multiple injection systems allows parts to be moulded concurrently in different materials. The different materials may have different characteristics resulting in different process parameters, for instance, the different materials may be injected into the different mould cavities at different temperatures, pressures, or flow rates.

The time taken for the sequence of closing the mould, loading with glass, injection, cooling, opening the mould, ejection and removal of the part is known as the cycle time. The time required for opening and closing the mould is a feature of the injection moulding machine used. However, the time required for injection and cooling relates to the particular parts being produced. The injection time may be calculated by dividing the volume of elastomeric material required for the part by the flow rate at which it is injected, if these values are known. Similarly, the cooling time is dependent on the volume of elastomeric material which has to be cooled, and in practice cooling time makes the biggest contribution to cycle time. Clearly, larger parts have longer cycle times than smaller parts.

According to the invention it is possible to manufacture combinations of parts with different cycle times, but maximum production efficiency is obtained when the cycle times of the different parts being produced concurrently are the same, or at least similar. Where cycle times are different, preferably the longer cycle time is within 20% of the shorter cycle time, more preferably the longer cycle time is within 10% of the shorter cycle time.

Achieving economic production involves balancing several factors. When setting up a new production line, an appropriate size of injection moulding machine needs to be chosen for the anticipated demand. Once the machine is in place, economic production involves selecting appropriately sized tooling, i.e. the number of moulding cavities, balancing the higher capital cost of larger tooling with the lower production costs that it will incur, since the cost of labour, energy, etc, will be spread over more parts. However, it is inefficient to use more cavities than the volume justifies, resulting in the rate of production greatly exceeding demand, because this merely results in frequent tool changes and excessive storage costs for the surplus parts until they are required.

Thus according to the invention it may be advantageous to combine a mould module having a single mould cavity for a low volume part with another module having two cavities for a medium volume part, or another module having three cavities for a high volume part, as illustrated in FIGS. 3 and 2. The invention thereby provides a method of reducing the production cost of edge encapsulated glazings of different configurations by selecting two or more different parts having similar cycle times for concurrent production, and further selecting mould modules having numbers of moulding cavities which are appropriate for the demand for the different glazings, so that the rate of production of each part is matched to the volume required of each part. The advantages of the invention are best exploited by planning production so that appropriate combinations of mould modules are used.

The invention claimed is:

1. A process for manufacturing at least two different discrete edge encapsulated glazings in the same moulding operation, the glazings comprising panes of glass of different configuration, wherein panes of glass which are minor images of each other are considered to be of the same configuration, and the process comprising moulding a glazing profile onto at least part of the periphery of each pane of glass by:
   providing a composite mould comprising at least two separate different interchangeable mould modules, each mould module comprising at least one mould cavity, thereby providing at least two different mould cavities;
   opening the composite mould;
   loading at least two different panes of glass into the at least two different mould cavities of the open composite mould;
   closing the composite mould;
   injecting fluid elastomeric material into the at least two different mould cavities;
   allowing the elastomeric material to set;
   opening the composite mould; and
   removing the at least two edge encapsulated glazings from the composite mould,
   wherein the liquid elastomeric material is injected into the at least two different mould cavities at the same time, so that a glazing profile is moulded onto each of the two different panes of glass concurrently.

2. A process as claimed in claim 1, wherein different fluid elastomeric materials are injected into two of the at least two different mould cavities.

3. A process as claimed in claim 1, wherein a cycle time is measured for each of the at least two different edge encapsulated glazings, and the cycle times for two of the glazings are different, but the longer cycle time is within 20% of the shorter cycle time.

4. A process as claimed in claim 3, wherein the longer cycle time is within 10% of the shorter cycle time.

5. A process as claimed in claim 1, wherein the fluid elastomeric material is injected into one of the at least two different mould cavities at a different temperature from the temperature at which it is injected into one of the other at least two different mould cavities.

6. A process as claimed in claim 1, wherein the fluid elastomeric material is injected into one of the at least two different mould cavities at a different pressure from the pressure at which it is injected into one of the other at least two different mould cavities.

7. An apparatus adapted for manufacturing at least two different discrete edge encapsulated glazings in the same moulding operation, the glazings comprising panes of glass of different configuration, wherein panes of glass which are mirror images of each other are considered to be of the same configuration, by moulding a glazing profile onto at least part of the periphery of each pane of glass, the apparatus comprising:

a composite mould comprising at least two separate different interchangeable mould modules, each mould module being adapted for receiving a pane of glass of different configuration from the other mould module, each mould module comprising male and female mould sections which together define at least one mould cavity for receiving the pane of glass, the at least two mould modules thereby defining at least two mould cavities, at least one mould cavity thereof being different from the others;

a clamp unit containing the composite mould, the clamp unit being operable to open the composite mould by separating the male and female mould sections of the different mould modules and to close the composite mould by urging the male and female mould sections of the different mould modules into sealing contact, the clamp unit being arranged to exert a clamp pressure on the mould sections when the composite mould is closed; and one or more injection units comprising means of supplying fluid plastics moulding material into the mould cavities of the composite mould concurrently.

8. An apparatus as claimed in claim 7, wherein the clamp unit comprises fixed and movable platens having faces to which the mould sections are attached.

9. An apparatus as claimed in claim 8, wherein the dimensions of the platens and mould sections are selected so that an integral number of mould sections fit onto each face of each platen.

10. An apparatus as claimed in claim 9, wherein the integral number is two, three or four.

11. An apparatus as claimed in claim 7, wherein a fixing system is provided which is adapted to mount multiple mould sections within the clamp unit, and allow rapid exchange of one or more mould sections.

12. An apparatus as claimed in any of claim 7, wherein a separate injection unit is provided for each mould module.

13. A composite mould, comprising two or more separate different interchangeable mould modules, each mould module being adapted for receiving a pane of glass of different configuration from the other mould module, each mould module comprising male and female mould sections which together define one or more mould cavities for receiving the pane or panes of glass, wherein the two or more mould cavities are configured differently so as to receive panes of glass of different configuration, wherein panes of glass which are mirror images of each other are considered to be of the same configuration, wherein the male mould sections of each of the different mould modules are mounted on a first platen, the female mould sections of each of the different mould modules are mounted on a second platen opposing the first plated, and at least one of the first platen and the second platen is configured to be moved towards and away from the other of the first platen and the second platen.

14. A composite mould as claimed in claim 13, wherein two of the two or more mould modules comprise different numbers of mould cavities.

15. A composite mould as claimed in claim 13, wherein adjacent pairs of the two or more mould modules are attached directly to each other.

* * * * *